(12) United States Patent
Al-Motoutah et al.

(10) Patent No.: US 9,186,761 B1
(45) Date of Patent: Nov. 17, 2015

(54) MULTI-SOCKET WRENCH

(71) Applicants: Mubarak A. H. F. H. Al-Motoutah, Salam (KW); Abdulrahman E. G H. H. Hasan, Al-Qurain (KW); Talal Nawaf Al-Shaalan, Al-Qurain (KW)

(72) Inventors: Mubarak A. H. F. H. Al-Motoutah, Salam (KW); Abdulrahman E. G H. H. Hasan, Al-Qurain (KW); Talal Nawaf Al-Shaalan, Al-Qurain (KW)

( * ) Notice: Subject to any disclaimer, the term of this patent is extended or adjusted under 35 U.S.C. 154(b) by 0 days.

(21) Appl. No.: 14/811,786

(22) Filed: Jul. 28, 2015

(51) Int. Cl.
  *B25B 21/00* (2006.01)
  *B23P 19/06* (2006.01)

(52) U.S. Cl.
  CPC ............. *B23P 19/069* (2013.01); *B25B 21/002* (2013.01)

(58) Field of Classification Search
  CPC ..... B23P 19/069; B25B 13/48; B25B 13/467; B25B 17/02; B25B 21/002
  See application file for complete search history.

(56) References Cited

U.S. PATENT DOCUMENTS

| | | | | |
|---|---|---|---|---|
| 2,069,882 A * | 2/1937 | Hall | ...................... | B23P 19/069 81/467 |
| 3,392,608 A | 7/1968 | Schanen et al. | | |
| 3,905,254 A | 9/1975 | Palatnick et al. | | |
| 3,992,964 A | 11/1976 | Osmond | | |
| 4,506,567 A * | 3/1985 | Makhlouf | ............... | B25B 17/02 81/57.3 |
| 5,129,290 A * | 7/1992 | Haviv | .................... | B25B 13/463 81/57 |
| 5,690,005 A * | 11/1997 | Jung | ........................ | B25B 13/48 376/260 |
| 6,134,989 A | 10/2000 | Stevens | | |
| 6,305,245 B1 | 10/2001 | Kress | | |
| 6,453,778 B1 * | 9/2002 | Long | ....................... | B25B 17/00 81/57.13 |
| 6,918,322 B1 | 7/2005 | Biller | | |
| 7,077,031 B1 | 7/2006 | Frederiksen | | |
| 7,320,267 B1 * | 1/2008 | Chen | ..................... | B25B 13/463 81/57.3 |
| 8,020,626 B2 * | 9/2011 | Francis | ................. | B23P 19/069 166/360 |
| 8,316,739 B2 * | 11/2012 | Vollmuth | .............. | B23P 19/069 81/57.14 |
| 2002/0117027 A1 | 8/2002 | Boston | | |
| 2006/0169107 A1 * | 8/2006 | Taniguchi | ............. | B23P 19/069 81/57.22 |

\* cited by examiner

*Primary Examiner* — David B Thomas
(74) *Attorney, Agent, or Firm* — Richard C. Litman

(57) ABSTRACT

The multi-socket wrench includes a housing, first and second head portions extending from the housing, a plurality of main shafts having an exposed end extending through the second head portion, and a socket removably attached to each exposed end of each of the main shafts for engaging lug nuts on tire. A gearbox is disposed within the housing. The gearbox includes a drive assembly that is connected to the main shafts by a chain. The drive assembly drives the main shafts to rotate in a clockwise or counter clockwise direction. The drive assembly is configured to provide two different levels of torque to drive the main shafts to simultaneously tighten or untighten the lug nuts of a car tire.

11 Claims, 6 Drawing Sheets

MULTI-SOCKET WRENCH

BACKGROUND OF THE INVENTION

1. Field of the Invention

The present invention generally relates to automotive tools, and particularly to a multi-socket wrench that simultaneously tightens or loosens the lug nuts securing a wheel on an axle.

2. Description of the Related Art

Stock car racing has become a popular sport, especially in the United States and Europe. During the multiple laps of a stock car race, each car must endure time-consuming pit stops for refueling and tire changes that are performed by the pit crew. The more efficient the pit crew is in accomplishing the refueling and tire changing, the less time the car is in the pit, resulting in improved lap times and enhancing the chances of winning the race. Since the stock car wheel is secured to the axle with multiple lug nuts (usually five, but sometimes four), the pit crew tire men are required to loosen and remove each of the twenty lug nuts (five per wheel) to remove the wheels and worn tires. Additionally, each of the twenty lug nuts must be replaced and tightened when the new wheels and tires are mounted. A tool that would allow the tire men to loosen or tighten the five nuts of each wheel simultaneously would certainly lessen the time in the pit per stop and create a tremendous advantage over pit crews using conventional means for servicing stock cars during races. Such a tool would also be useful for automobile tire centers and automotive repair garages.

Thus, a multi-socket wrench solving the aforementioned problems is desired.

SUMMARY OF THE INVENTION

The multi-socket wrench includes a housing, first and second head portions extending from the housing, a plurality of main shafts having an exposed end extending through the second head portion, a plurality of support or idler shafts extending between the first and second head portions, and a socket removably attached to each exposed end of each of the main shafts for simultaneously engaging all of the lug nuts on a tire. A gearbox is disposed within the housing. The gearbox includes a drive assembly that is connected to the main shafts by a chain. The drive assembly drives the main shafts to rotate in a clockwise or counter clockwise direction. The drive assembly is configured to provide two different levels of torque, e.g., a first amount and/or a second amount that is higher than the first amount, to drive the main shafts to tighten or untighten the lug nuts of a car tire.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
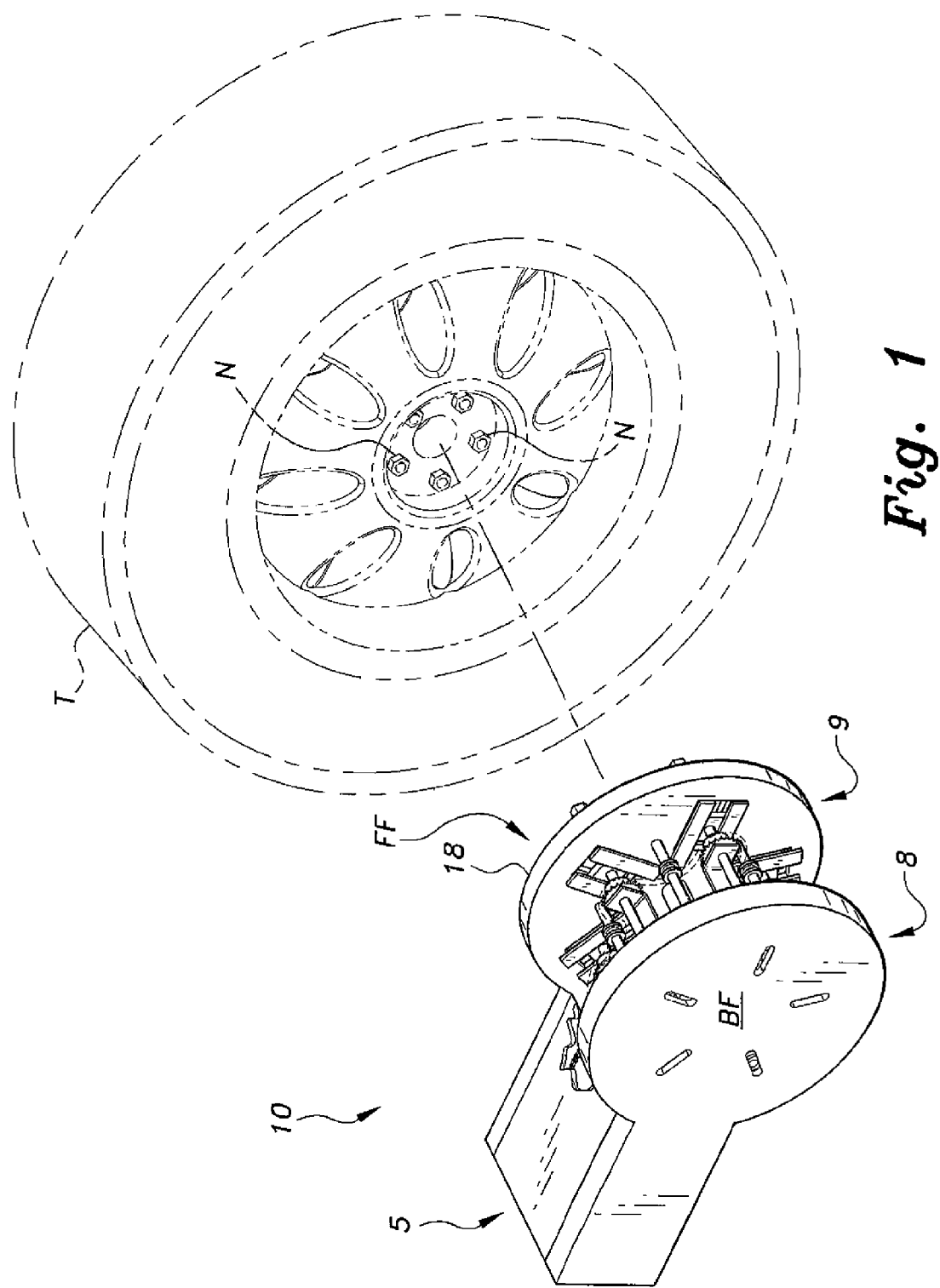
FIG. 1 is an environmental, perspective view of a multi-socket wrench according to the present invention.

Referring to FIGS. 1-6, the multi-socket wrench 10 includes a generally rectangular housing 5, first and second head portions 8, 9 extending from the housing 5, a plurality of main shafts 20 having an exposed end 20a extending through the second head portion 9, a plurality of support or idler shafts 22 extending between the first and second head portions 8, 9, and a socket 24 removably attached to each exposed end 20a of each of the main shafts 20 for engaging lug nuts N on tire T. A gearbox 32 (FIG. 4) is disposed within the housing 5. The gearbox includes a drive assembly 50 (FIG. 5) that is connected to the main shafts 20 by chain 30. The drive assembly drives the main shafts to rotate in a clockwise or counter clockwise direction. As will be described in more detail below, the drive assembly 50 is configured to provide two different levels of torque, e.g., a first amount and a second amount that is higher than the first amount, to drive the main shafts 20 to tighten or untighten the lug nuts N of the tire T. The multi-socket wrench has a front face FF and a back face BF. In operation, the front face FF faces the tire T and the back face BF faces away from the tire T, as illustrated in FIG. 1.

Figure 2:
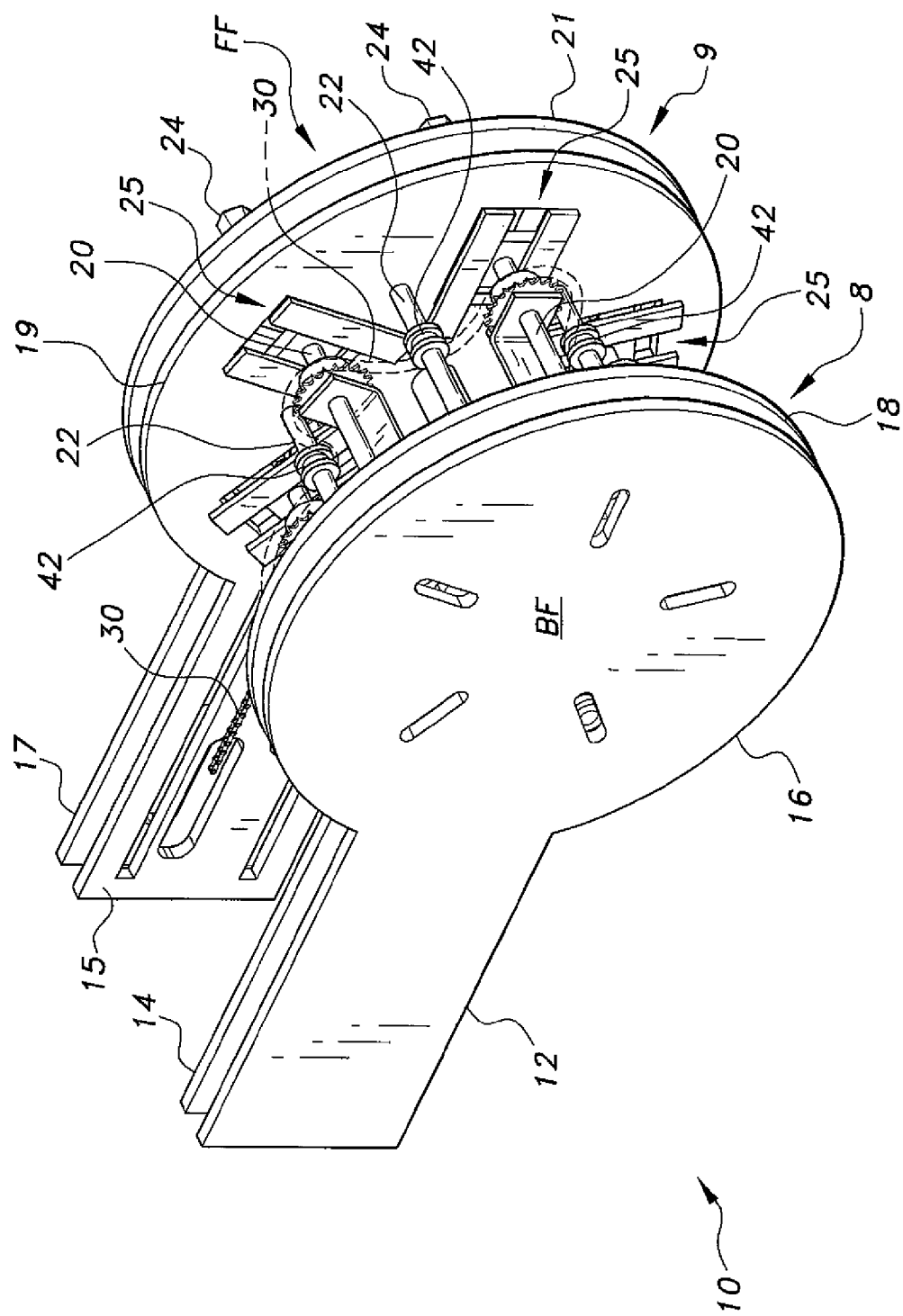
FIG. 2 is a partial perspective view of a multi-socket wrench according to the present invention.
Figure 3:
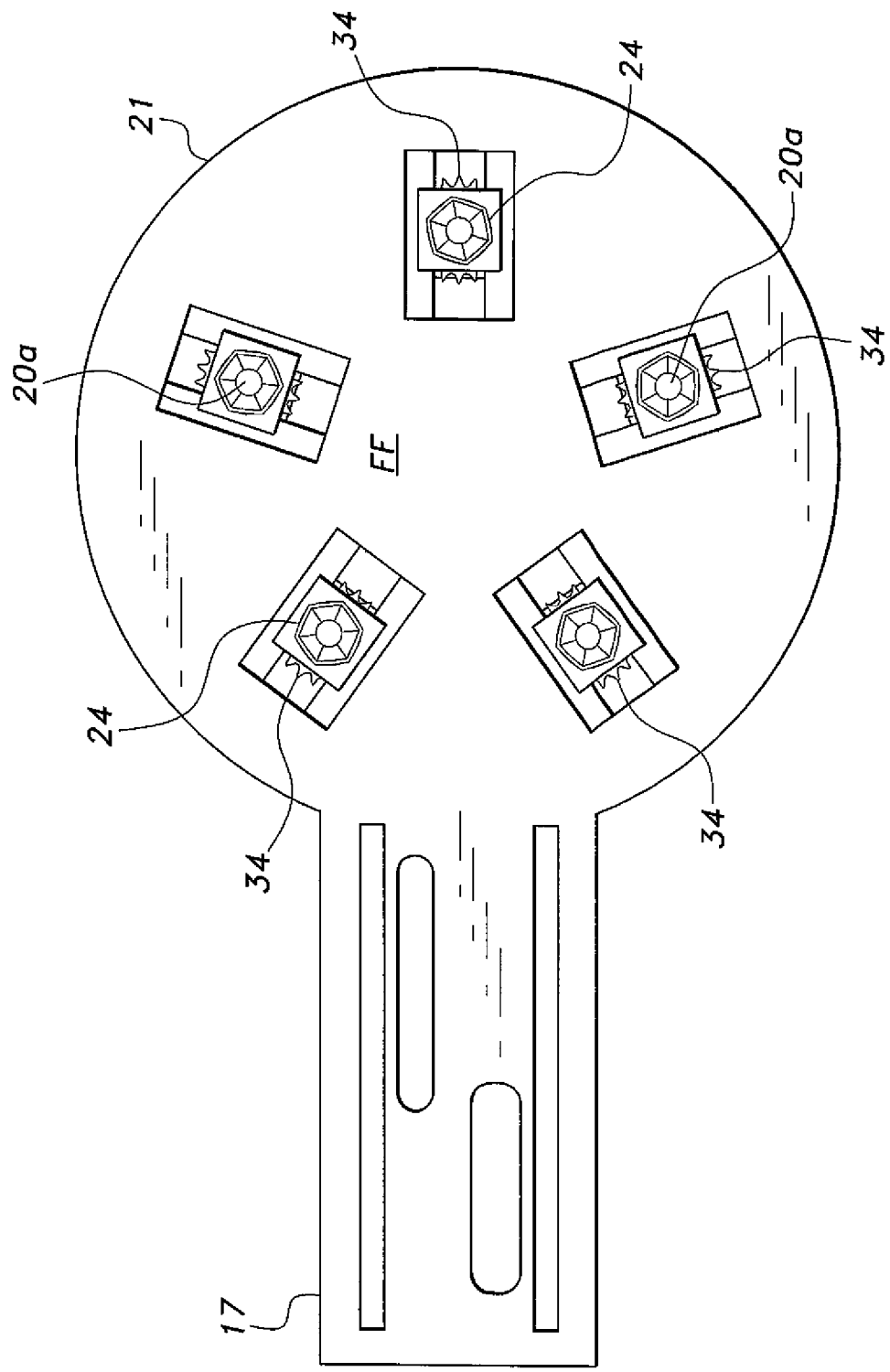
FIG. 3 is a front view of a multi-socket wrench according to the present invention.
Figure 4:
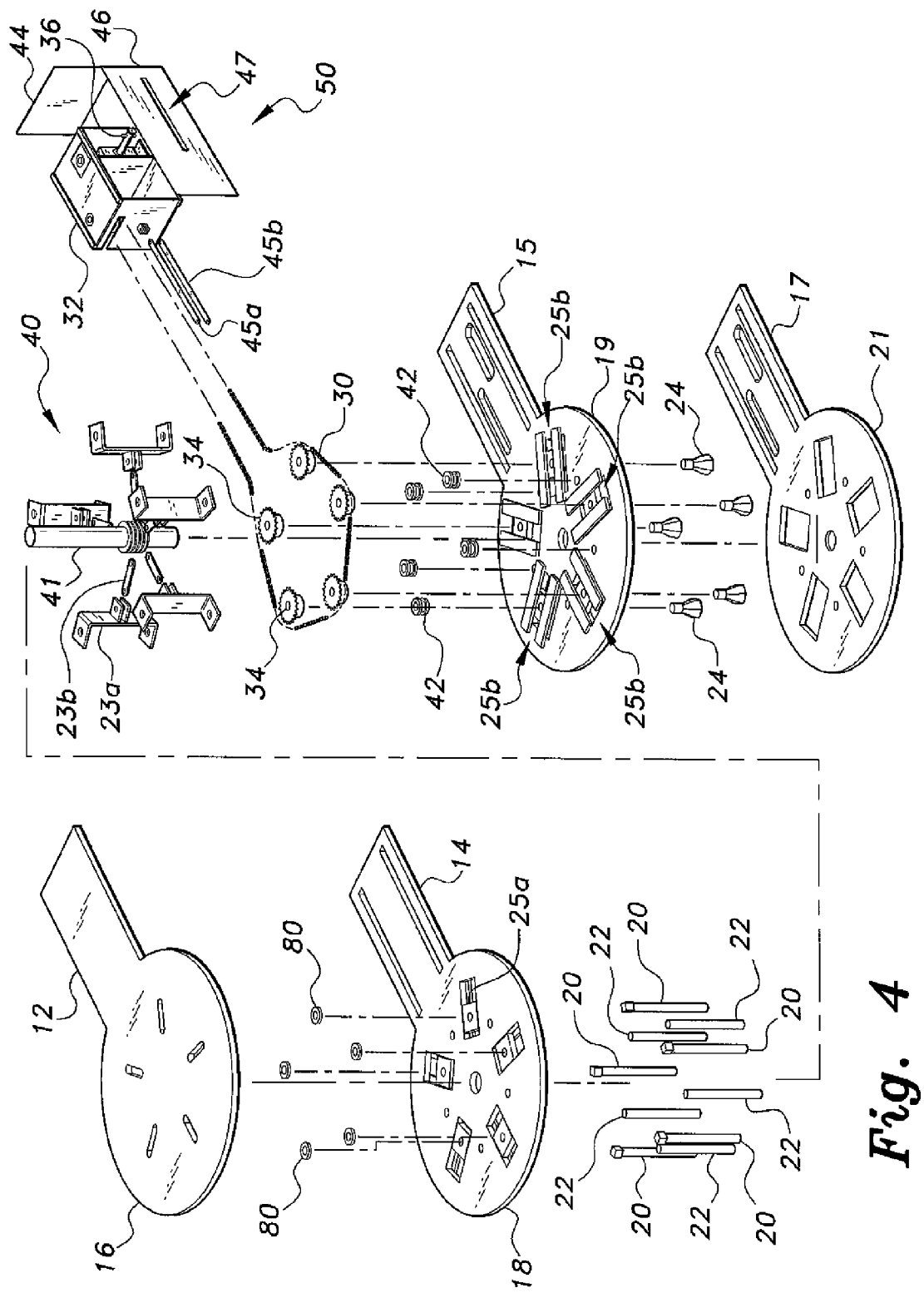
FIG. 4 is an exploded partial perspective view of a multi-socket wrench according to the present invention.
Figure 5:
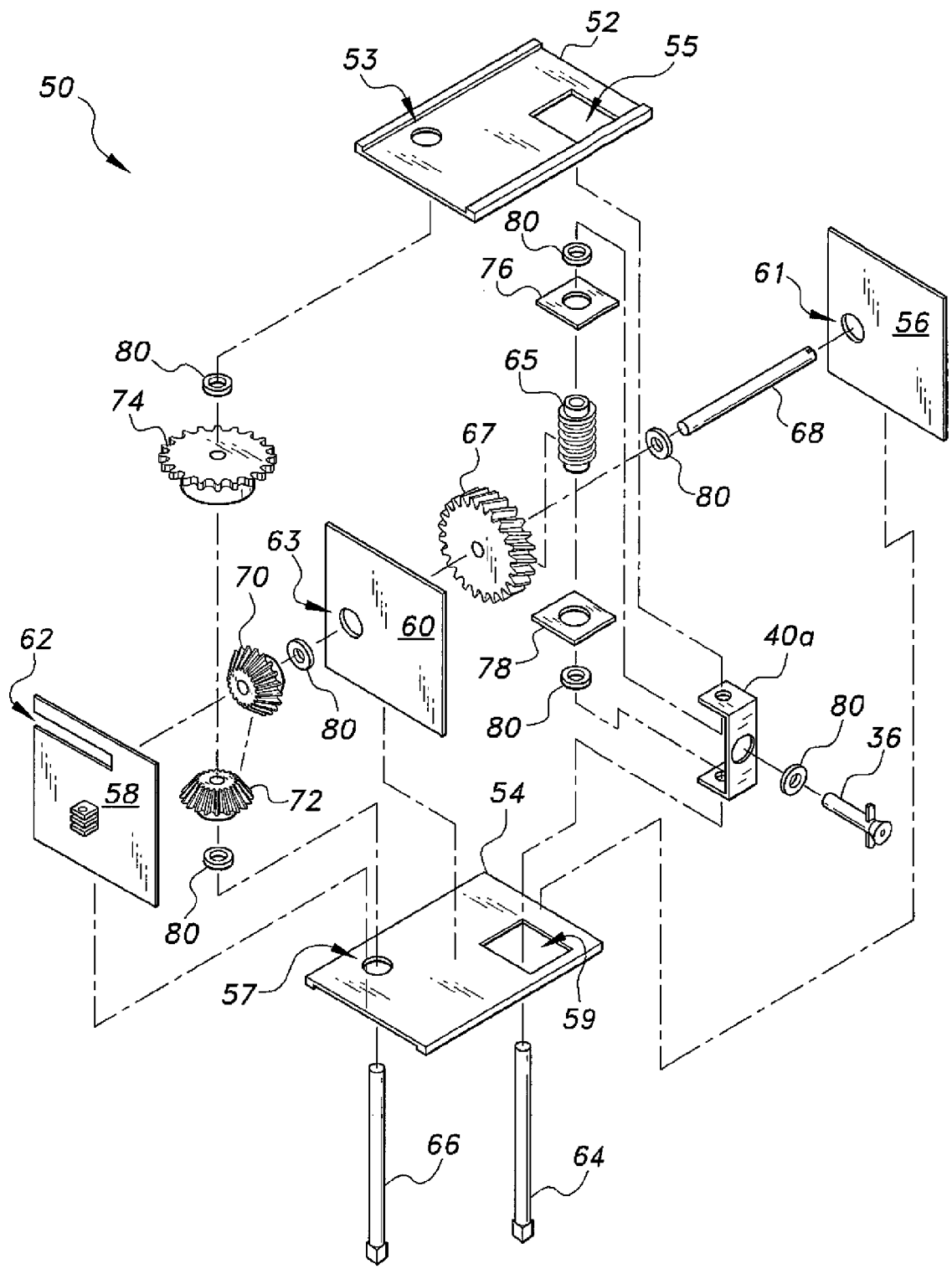
FIG. 5 is an exploded view of a drive assembly for use in connection with a multi-socket wrench according to the present invention.

The housing can have a first exterior panel 12 and an identically shaped first interior panel 14, a second interior panel 15 and an identically shaped second exterior panel 17. The housing 5 can include a back side panel 44 and a side member 46 having a first slot 47. The first head portion 8 can have a first exterior head portion 16 and a first interior head portion 18 and the second head portion 9 can have a second interior head portion 19 and a second exterior head portion 21, as illustrated in FIG. 2. The first interior head portion 18 and the second interior head portion 19 can include a plurality of upper slide assemblies 25a and a plurality of lower slide assemblies 25b, respectively. The upper slide assemblies 25a are slidable within the first interior head portion 18. The lower slide assemblies 25b are slidable within the second interior head portion 19.

Each of the plurality of main shafts 20 extend through a respective secondary sprocket 34. Each of the secondary sprockets 34 engage chain 30 and support chain 30 on a respective main shaft 20. The plurality of support or idler shafts 22 are positioned in between adjacent main shafts 20. Each of the plurality of support shafts 22 have a chain support 42 configured to support portions of chain 30, which are not supported by the main shafts 20. Each of the plurality of main shafts 20 are held within U-shaped brackets 23a. The brackets 23a are adjustably linked by linkers 23b to a center column 41. The center column 41 extends through first interior head portion 18 and second interior head portion 19. Each of the brackets 23a are configured to slide within a respective upper slider assembly 25a and a corresponding lower slider assembly 25b. Thus, spacing between the plurality of main shafts may be adjusted by sliding the brackets 23a inwards or outwards within the first interior head portion 18 and the second interior head portion 19, in order to match the spacing between lug nuts N on the tire T.

A plurality of connecting rods 45a, 45b are provided for securing the gearbox 32 to center column 41. The drive assembly 50 in the gear box 32 can include a selecting switch 36 that can be pushed inward and pulled outward, a high torque shaft 64, a low torque shaft 66, a main drive shaft 68, a worm drive having a worm screw 65 and a worm wheel 67, a plurality of bevel gears, such as a first bevel gear 70 and a second bevel gear 72, a main sprocket 74, a plurality of bearings 80, and a portion of the chain 30. The chain 30 engages each of the plurality of secondary sprockets 34 and the main sprocket 74. As described in detail below, rotation of the main sprocket 74 rotates the chain 30, which causes each secondary sprocket 34 and corresponding main shafts 20 to rotate simultaneously.

Figure 6:
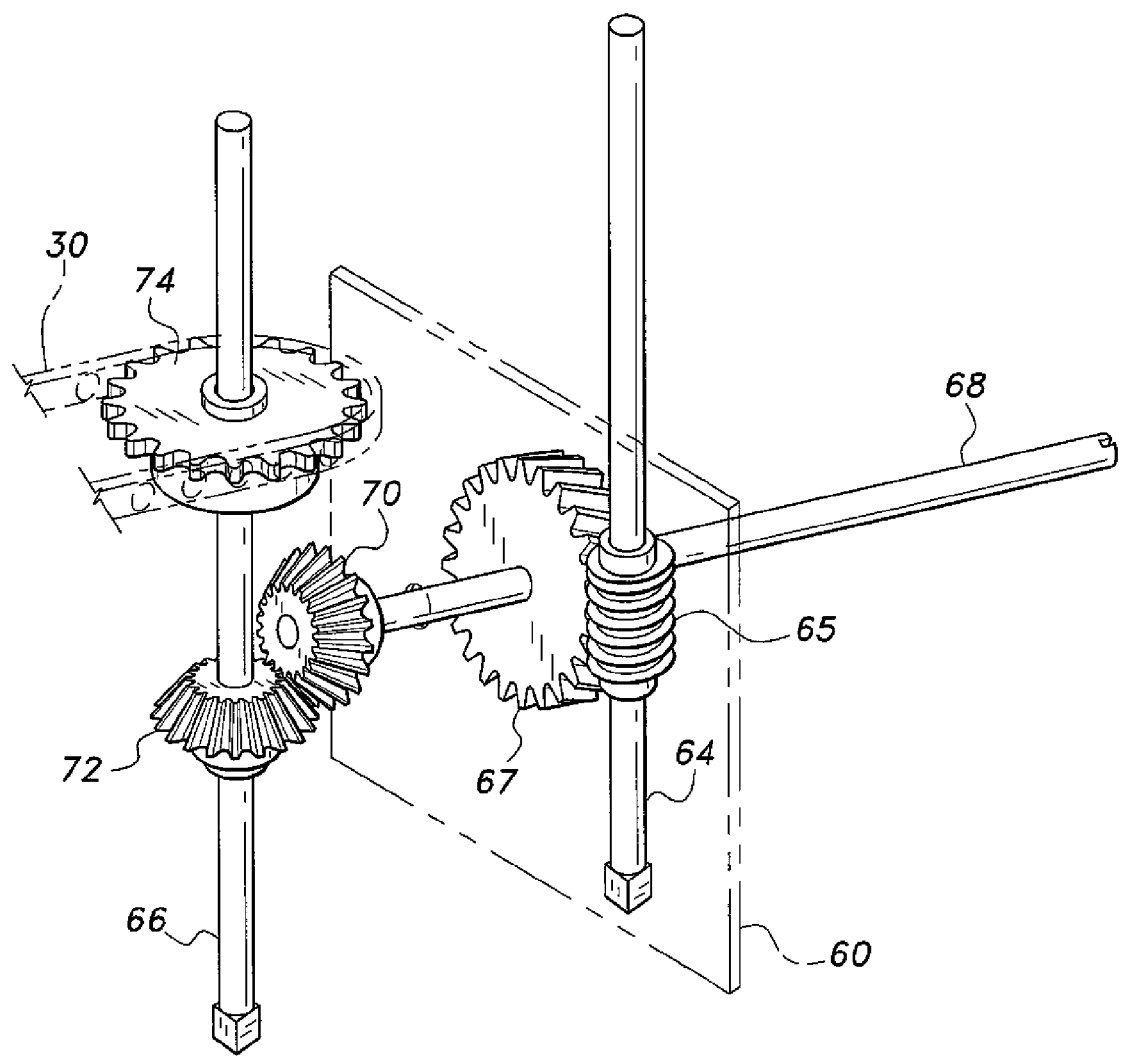
FIG. 6 is an exploded, partial view of a drive assembly for use in connection with a multi-socket wrench according to the present invention.

Referring to FIG. 6, the worm screw 65 can be positioned on the high torque shaft 64 and the worm wheel 67 can be positioned on the main drive shaft 68, such as in communicating relation with the worm screw 65. The first bevel gear 70 can be positioned on the main drive shaft 68. The second bevel gear 72 can be positioned on the low torque shaft 66, in communicating relation to the second bevel gear 72. Further, the main sprocket 74 can be positioned on the low torque shaft 66, such as above the first bevel gear 70 and the second bevel gear 72.

The drive assembly 50 can also include a support bracket 40a, such as a "U"-shaped bracket configured for supporting the worm screw 65, a first worm drive slider 76 positioned at one end of the support bracket 40a, and a second worm drive slider 78 positioned at the other end of the support bracket 40a. The worm drive sliders 76, 78 are configured to allow the worm screw 65 to slide in a forward direction and in a backward direction, such as by pushing or pulling the selecting switch 36, inside the gearbox 32 so as to allow the worm screw 65 to engage and disengage, respectively, from the worm wheel 67.

The gearbox 32, configured to house the drive assembly 50, can include a top side 52, a bottom side 54, a right side 56, a left side 58, and an inner plate 60. The top side 52 can include a first opening 53 configured to receive an end of the low torque shaft 66, and a second opening 55 configured to receive an end of the high torque shaft 64. The bottom side 54 can include a third opening 57, aligned with the first opening 53, configured to receive an opposing end of the low torque shaft 66, and a fourth opening 59, aligned with the second opening 55, configured to receive an opposing end the high torque shaft 64. The right side 56 can include a fifth opening 61, and the inner plate 60 can include a seventh opening 63. The fifth opening 61 and the seventh opening 63 are configured to receive opposing ends of the main drive shaft 68. The left side 58 can include a sixth opening 62, configured to allow the chain 30 to pass therethrough engage each of the plurality of sprockets 34.

By way of operation, sockets 24 are removably attached to the ends 20a of the plurality of main shafts 20 and then mated to lug nuts N. If high torque is desired for bolting or unbolting the lug nuts N, a user can push the selecting switch 36 inwards, i.e., into the gear box 32, to allow the worm screw 65 to engage the worm wheel 67. A power tool (not shown) can be employed to drive the high torque shaft 64 for turning the worm screw 65. Rotation of the worm screw 65 produces a high amount of torque. The torque generated thereby is transferred from the worm screw 65 to the worm wheel 67, which causes high torque rotation of the bevel gears 70, 72 and the main sprocket 74, and ultimately drives the main shafts 20 to bolt or unbolt the lug nuts N with identical torque. If, however, low torque is desired, the selecting switch 36 can be pulled outwards to disengage the worm screw 65 from the worm wheel 67. A power tool (not shown) can be employed to drive the low torque shaft 65 to rotate the bevel gears 70, 72 and the main sprocket 74, which ultimately drives the main shafts 20 to bolt or unbolt the lug nuts N with identical torque.

It is to be understood that the present invention is not limited to the embodiments described above, but encompasses any and all embodiments within the scope of the following claims.

We claim:

1. A multi-socket wrench, comprising:
   a housing including a gearbox having a drive assembly;
   first and second head portions extending from the housing, the first head portion being spaced from the second head portion;
   a plurality of main shafts having a first end and a second exposed end, the first end being on the first head portion and the second end extending through the second head portion, each of the plurality of main shafts including a secondary sprocket; and
   a chain that extends between and connects the drive assembly and the main shafts,
   whereby the drive assembly is configured for providing two different levels of torque for simultaneously rotating the plurality of main shafts.

2. The multi-socket wrench according to claim 1, further comprising a center column, the center comlum extending between and connecting the first head portion and the second head portion.

3. The multi-socket wrench according to claim 1, wherein the plurality of main shafts slidably engage the first head portion and the second head portion.

4. The multi-socket wrench according to claim 1, wherein the drive assembly comprises:
   a main drive shaft connected to a worm wheel and a first bevel gear;
   a high torque shaft connected to a worm screw, the worm screw selectively in contact with the worm wheel,
   a low torque shaft connected to a second bevel gear and a main sprocket, the second bevel gear contacting the first bevel gear; and
   a movable selecting switch selectively in communication with the worm screw.

5. The multi-socket wrench according to claim 4, wherein the high torque shaft is disposed parallel to the low torque shaft.

6. The multi-socket wrench according to claim 5, wherein the main drive shaft is disposed substantially perpendicular to the high torque shaft and the low torque shaft.

7. The multi-socket wrench according to claim 4, wherein the chain engages the main sprocket and the secondary sprockets on the plurality of main shafts.

8. The multi-socket wrench according to claim 1, wherein the plurality of main shafts includes five main shafts.

9. The multi-socket wrench according to claim 1, further comprising a plurality of support shafts extending between the first and second head portions, the plurality of support shafts configured for providing additional support to the chain.

10. The multi-socket wrench according to claim 9, wherein the plurality of support shafts includes five support shafts.

11. The multi-socket wrench according to claim 1, further comprising a plurality of sockets removably attachable to the exposed ends of the plurality of main shafts, each of the plurality of sockets having an inner surface adapted to engage a lug nut.

* * * * *